(12) United States Patent
Bähren et al.

(10) Patent No.: US 7,668,648 B2
(45) Date of Patent: *Feb. 23, 2010

(54) MOTOR VEHICLE NAVIGATION SYSTEM

(75) Inventors: Frank Bähren, Karlsruhe (DE); Michael Becker, Philippsburg (DE); Harald Schöpp, Ettkingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 209 days.

This patent is subject to a terminal disclaimer.

(21) Appl. No.: 11/620,793

(22) Filed: Jan. 8, 2007

(65) Prior Publication Data

US 2007/0192021 A1    Aug. 16, 2007

Related U.S. Application Data

(63) Continuation of application No. 09/801,104, filed on Mar. 6, 2001, now Pat. No. 7,162,364.

(51) Int. Cl.
*G01C 21/00* (2006.01)
(52) U.S. Cl. ................ 701/207; 701/208; 340/990
(58) Field of Classification Search ............... 701/207, 701/208; 340/990
See application file for complete search history.

(56) References Cited

U.S. PATENT DOCUMENTS

| | | | |
|---|---|---|---|
| 4,796,189 A | 1/1989 | Nakayama et al. | 340/990 |
| 4,996,645 A | 2/1991 | Van Der Zon | 1/969 |
| 5,159,556 A | 10/1992 | Schorter | 15/50 |
| 5,627,547 A | 5/1997 | Ramaswamy et al. | 342/357.08 |
| 5,689,252 A | 11/1997 | Ayanoglu et al. | 340/991 |
| 5,721,684 A | 2/1998 | Takita | 364/443 |
| 5,732,385 A | 3/1998 | Nakayama et al. | 340/995 |
| 5,774,824 A | 6/1998 | Streit et al. | 340/990 |
| 5,774,828 A | 6/1998 | Brunts et al. | 340/990 |
| 5,802,492 A | 9/1998 | DeLorme et al. | 340/990 |
| 5,821,880 A | 10/1998 | Morimoto et al. | 340/988 |
| 5,848,373 A | 12/1998 | DeLorme et al. | 340/990 |
| 5,862,511 A | 1/1999 | Croyle et al. | 7/48 |
| 5,918,180 A | 6/1999 | Dimino | 340/825.5 |
| 5,944,768 A | 8/1999 | Ito et al. | 340/990 |
| 6,067,502 A | 5/2000 | Hayashida et al. | 701/209 |
| 6,169,515 B1 | 1/2001 | Mannings et al. | 342/357.1 |
| 6,240,361 B1 | 5/2001 | Ise et al. | 340/995 |
| 6,321,158 B1 | 11/2001 | DeLorme et al. | 340/995 |
| 6,341,254 B1 | 1/2002 | Okude et al. | 701/208 |
| 6,346,938 B1 | 2/2002 | Chan et al. | 345/419 |
| 7,162,364 B2 * | 1/2007 | Bahren et al. | 701/207 |

* cited by examiner

*Primary Examiner*—Khoi Tran
*Assistant Examiner*—Brian J Broadhead
(74) *Attorney, Agent, or Firm*—O'Shea Getz P.C.

(57) ABSTRACT

The invention relates to a method and an apparatus to display a geographical picture on a screen (36) of a monitor (30), which is connected over a data bus (3) to a first computer (1). The invention specifies that the first computer (1) furnishes abstract data (a, c, f), determined on a geographical basis, to the data bus (3), and that these data (a, c, f) are processed in a second computer (31) situated in the monitor (30), for the visual display of a picture on the screen (36) of the monitor (30).

13 Claims, 2 Drawing Sheets

MOTOR VEHICLE NAVIGATION SYSTEM

PRIORITY INFORMATION

This application is a continuation of Ser. No. 09/801,104 filed Mar. 6, 2001 now U.S. Pat. No. 7,162,364.

BACKGROUND OF THE INVENTION

The present invention relates to the field of motor vehicle navigation systems, and in particular to a motor vehicle navigation system that includes a modular display computing system for presenting navigational data to a motor vehicle user.

Navigation systems are increasingly being used in motor vehicles. These systems generally include: (i) a control unit for entering the starting location, any intermediate destinations, and the final destination; (ii) a data medium for storing navigational data (e.g., information to display road maps); (iii) a navigation computer to plan/compute the route and provide guidance to the destination; (iv) a data processing unit to process the route data into picture information; and (v) a display to display road maps, position information, destination information, etc. The navigation system also includes a plurality of sensors to determine the vehicle position, speed, orientation, et cetera and provide that information to the navigation computer. The individual components of the navigation system communicate over a data bus. The data processing unit often includes a picture memory that stores picture information.

U.S. Pat. No. 5,689,252 entitled "Navigation System for an Automotive Vehicle" discloses a navigation system that includes a data input device, a GPS signal receiver, a direction sensor, a distance sensor, and a traffic information receiver. Data from these components are input to a microcontroller that plans the route. The microcontroller retrieves map information (e.g., road maps) from a CD-ROM. The route data computed by the microcontroller are then displayed on a CRT, which is also connected to the microcomputer. Notably, road map information cannot be displayed directly, but first must be transformed by the microcontroller into picture information suitable for presentation on the CRT.

Newer navigation units provide the user with the ability to select the picture section for displaying, using for example zoom or scroll functions. In addition, information indicative of the direction and motion of the motor vehicle is frequently shown on the road maps appearing on the display. User commands (e.g., zoom and/or scroll) and system demands (e.g., vehicle motion) regularly changes the display picture information, and thus the display picture information must be continuously updated in order to present the user with accurate information indicative of the current motor vehicle position.

Prior art navigational systems require that road map information be retrieved by the navigation computer for each displayed picture, and placed into intermediate storage in the picture memory.

Published European patent application EP 0 306 088 A1 entitled "Vehicle Navigation Device with Reproduction of a Selected Map Element According to a Predetermined Representation Standard" discloses a new generation navigation device. In this navigation device, the individual components are connected over a data bus. Such a linkage is customary in so-called linked driver information systems. The advantage of such linked driver information systems is that a plurality of individual components can be linked to the data bus line. For example, a display may be used not only to display navigation data, road maps, etc., but, for example, can also indicate a defect in the vehicle or the like.

The navigation device described in the published application EP 0 306 088 A1 includes a data bus, a data memory in which a large number of road maps and navigation data are stored, a navigation computer to plan the route, and a data processing unit that processes data into picture information. The data processing unit includes a picture memory to store the picture information. The navigation device also includes a display connected to the data processing unit to display picture information, and a communication block with a control unit for entering the starting position, intermediate destinations, and/or the final destination.

In such a system, the picture information of each road map is loaded individually into the picture memory. Such picture information is always transferred over the bus line. If the user wants to change, for example, the current screen display, or if the motion of the vehicle causes picture information to change, road map information must be transferred from the data memory to the picture memory to provide the proper data for display. For a screen display with sufficient picture refresh cycles, the data bus must have a large bandwidth, which generally is often not available. An additional problem is that the data bus is needed almost exclusively for transferring picture information, and therefore other information or data cannot be transferred, or can be transferred only serially during the remaining interim times.

Furthermore, a continuous and thus flowing display of geographical contents is not assured, because the screen shows only the data transferred over the data bus, and the data capacity that can be transferred on the bus is limited. Because the capacity of the bus is limited and because of the bus latency times, scroll or zoom operations, for instance, often cause dramatic picture changes that are perceived as troublesome by the viewer.

A problem with these prior art systems is that the geographical map for the display is calculated by the navigation computer. The data for the complete map to be displayed are transferred into a planar coordinate system corresponding to the display surface and are then sent by the navigation computer over the data bus to the display. With previously known systems, the monitor operates passively (i.e., only the received data are visualized). That is, there is no "intelligent" processing of the received data.

Therefore, there is a need for an improved motor vehicle navigation system.

SUMMARY OF THE INVENTION

Briefly, according to an aspect of the present invention, a motor vehicle navigation system includes a position sensor that senses the geographical position of the navigation system and provides a first navigation system position signal indicative thereof. The system also includes a navigation computing unit that receives the first navigation system position signal, and transmits onto a data bus (i) a first position signal indicative of the position of a trip starting location, (ii) a second position signal indicative of a trip destination location, and (iii) the received navigation system position signal. A monitor unit receives the first position signal, the second position signal, and the received navigation system position signal. The monitor unit also receives map data from a map memory device. The monitor processes this received data to generate initial image data including map data indicative of the trip starting location, the trip destination and the current position of the navigation system, and presents on a display within the motor vehicle an initial image indicative of the initial image data.

The monitor unit may include a road map memory for storing road map information. This road map memory stores the information that has already been transmitted from the navigation computing unit. This information, which is now locally available in the monitor unit, is available for picture display as needed without requiring communication with the navigation computer. Not until picture information is to be displayed, which is available only in the data memory connected to the data bus, is access to the navigation computer and thus to the data bus necessary, since the data bus is responsible for transmitting the necessary information. This newly transmitted information will displace the outmoded and no longer necessary information from the road map memory of the monitor, as necessary.

In general, modularization facilitates expansion or replacement of individual components. The maximum measure of flexibility in this regard is achieved by the invention in that the navigation computer and the monitor are designed as modules, each of which separately has a microprocessor/computer.

Since a vehicle normally moves continuously, suitable data management in the monitor unit may detect at an early stage what road map information will subsequently be needed due to the vehicle motion. This can be requested from the navigation computer prospectively (look-ahead principle), so that more time is available for its transmission. This also helps to reduce the need for bandwidth on the data bus, and thus correspondingly relieves the network.

The data bus is preferably configured and arranged as a "Media Oriented Synchronous Transfer" (MOST) bus or as a "Multi Media Link" (MML) bus. In combination with the modular structure of the present invention, standardized buses such as these ensure that the inventive navigation system can easily be integrated into nearly all current vehicle brands.

The monitor may include one or more control elements responsive to input user requests or to change the current picture information. It makes no difference here whether this information is directly conducted to the navigation computer or via the data bus.

The system may also include a sensor block that includes a plurality of sensors to detect position data. For example, a position sensor detects the instantaneous actual position, and/or a direction sensor detects instantaneous orientation of the vehicle, and a speedometer and/or tachometer can also be present.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
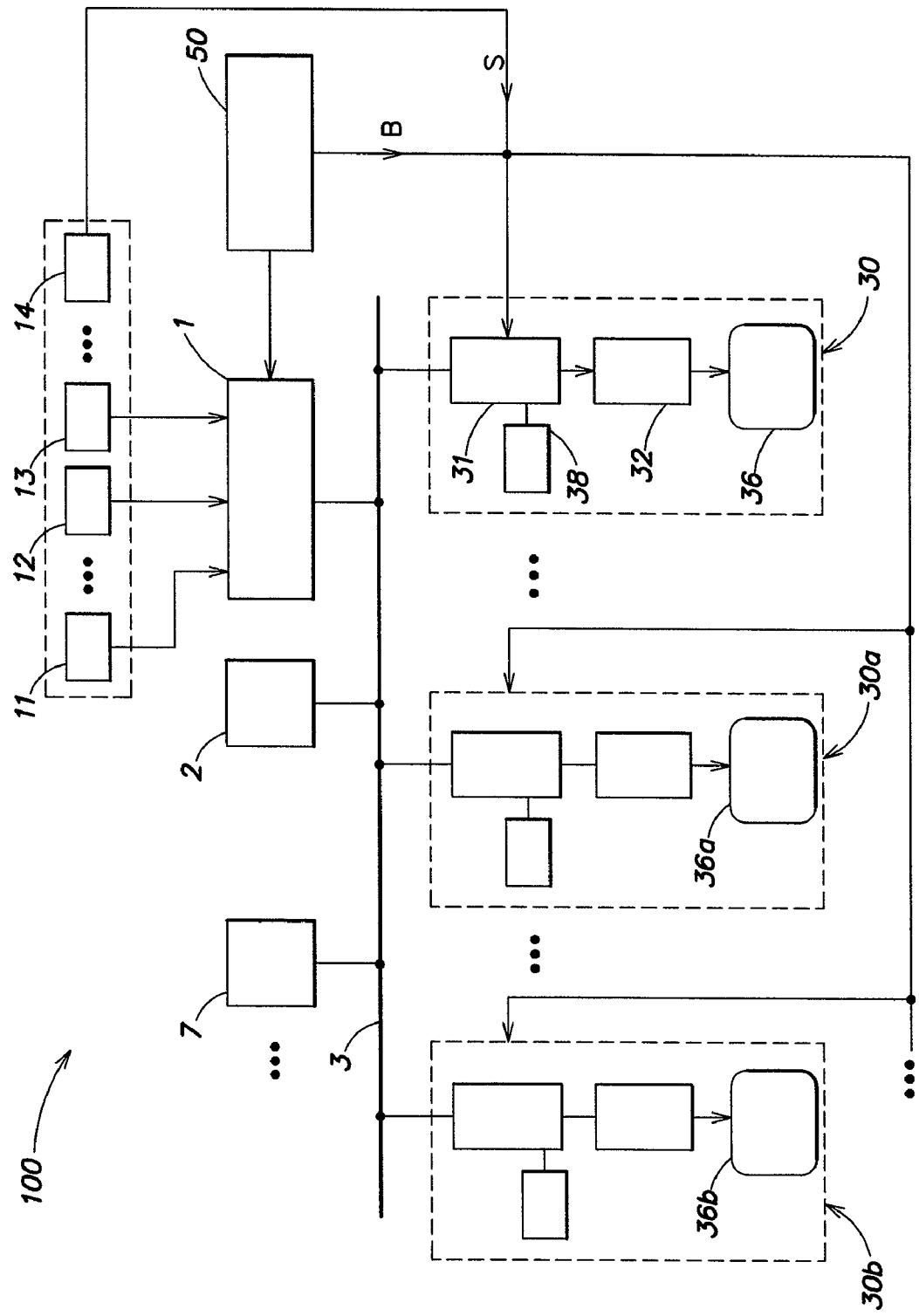
FIG. 1 is a block diagram illustration of a motor vehicle navigation system.

FIG. 1 is a block diagram illustration of a motor vehicle navigation system 100. The navigation system 100 includes a navigation computing unit 1, a data memory 2, a monitor unit 30, and various other components 7, each connected to a data bus 3 (e.g., an optical bus such as a MOST or MML bus). The navigation computer 1 is connected to a mass storage medium 50 (e.g., a CD drive) in order to retrieve road map information stored thereon. The navigation system 100 receives data signals from a speedometer 11, a direction sensor 12, a position sensor 13, and a tachometer 14. The monitor unit 30 includes an internal computer 31, a memory device 32, a display 36, and control elements 38.

The road map information in the navigation computer 1 is present as a geographical coordinate system (e.g., the WGS 84 coordinate system). The navigation computer 1 accesses such a geographical coordinate system for example through the above-mentioned mass storage unit 50. To generate a map to be displayed on the display 36 of the monitor unit 30, the navigation computer 1 transmits geographic data and additional necessary information to the monitor unit 30. Notably, the amount of transmitted data is less than that transmitted in known transmission methods. Significantly, the monitor unit 30 receives the data and generates the image to be presented on the display 36.

For example, if the motor vehicle operator wants to drive from place A to place B, data to identify these places must first be entered into the navigation computer 1 (e.g., via the control elements 38). When the navigation computer 1 knows the places A and B, the navigation computer 1 requests the geographic data of places A and B from its memory, or from the above-mentioned mass storage 50. In addition, the navigation computer 1 determines the roads located between places A and B. The navigation computer 1 then transmits the following data to the monitor unit 30, if world coordinates are used for the geographical data:

(a) longitude and latitude of place A;
(b) instruction that a place symbol belongs at the long/lat of place A;
(c) longitude and latitude of place B;
(d) instruction that a place symbol belongs at the long/lat of place B;
(e) instruction that a throughway runs between (a) and (c);
(f) longitude and latitude of the vehicle location; and
(g) instruction that a vehicle symbol belongs at the long/lat of the vehicle location.

Using data elements (a)-(g) received via the data bus 3, the monitor unit computer 31 generates an image to be presented on the display 36 by processing the geographical coordinates received over the data bus 3. For example, the image may be generated by placing two points for the places A and B on the display 36. Place symbols are then superposed on these points, and then the throughway between place A and B is drawn. Finally, a vehicle symbol is superposed on the location of the display 36 that corresponds to the current position of the vehicle. Naturally, these steps happen so fast that a viewer has the impression that all symbols appear on the picture simultaneously. Furthermore, the monitor unit computer 31 may build up the picture in the background, and the picture can be displayed only when it has been calculated in the computer of the monitor unit 30.

Advantageously, in contrast to conventional motor vehicle navigation systems, the navigation system of the present invention transmits less data over the data bus 3 when the vehicle moves. For example, as the vehicle moves the navigation computer 1 simply transmits the new geographical coordinates of the vehicle position over the data bus 3 to the monitor unit 30. The vehicle symbol on the screen is then superposed by the monitor unit computer 31 at the geographical coordinates associated with the current position of the motor vehicle. As a result, less information is required to be transmitted over the bus from the navigation computer 1 to the monitor unit 30. In contrast, in prior art motor vehicle navigation systems the data for the vehicle symbol would also have to be regularly transmitted from a navigation computer to a display, over a data bus. Similarly, other remaining symbols displayed on the screen (e.g., place, throughway, interstate highway, waterways, city names, river names, etc., etc.) would have to be regularly transmitted by the navigation computer over the data bus for presentation on the display in order to provide an accurate display. The monitor unit 30 includes memory in which the symbols and characters necessary for displaying a picture are stored.

According to an aspect of the present invention, the navigation computer 1 transmits initial trip information over the data bus 3 to the monitor display unit 30. The monitor unit 30 processes the received trip information to form an image that illustrates the starting position of the trip, the destination, the route of the trip and the current position of the motor vehicle. As the motor vehicle moves, the navigation computer 1 periodically transmits data indicative of the current position (e.g., longitude and latitude) of the vehicle location to the monitor unit 30. The monitor computing unit 31 then superposes a symbol indicative of the vehicle at the geographical coordinates associated with the current position of the motor vehicle, and provides this new image for presentation on the screen 36.

Advantageously, the navigation system of the present invention facilitates the reduction of the data bus transmission bandwidth, modularizes functions between the navigation computer and the monitor unit(s), and allows more than one display to be used based on the same data.

Figure 2:
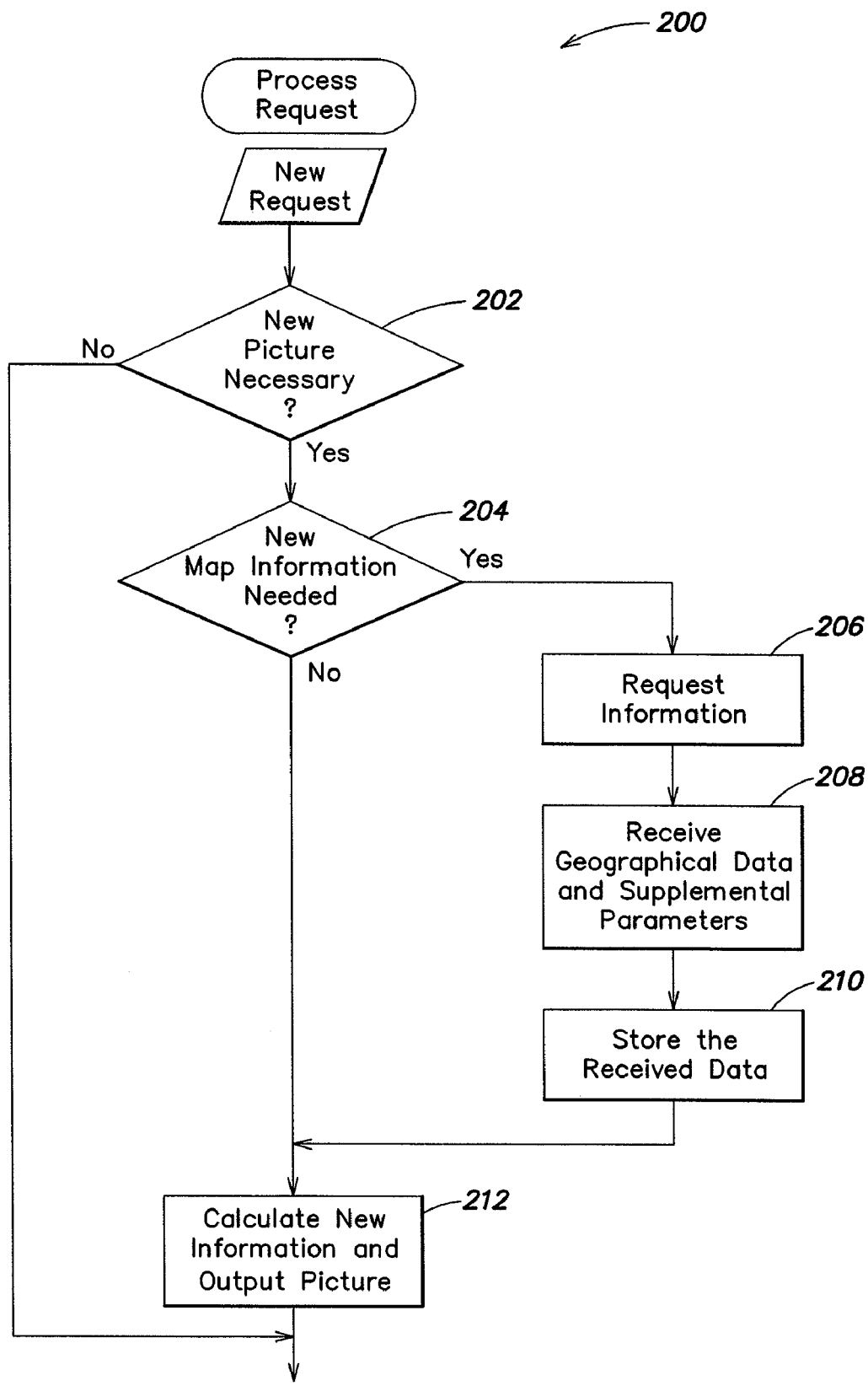
FIG. 2 is a flow chart illustration of processing steps associated with forming an image for presentation to a motor vehicle occupant.

FIG. 2 is a flow chart illustration of processing steps 200 associated with forming an image for presentation to a motor vehicle occupant. When a new request (e.g., user request B and/or system request S) occurs, a test 202 is performed to determine whether a new picture is required. For example, if the new vehicle position and/or orientation differs insignificantly from the information being displayed to the motor vehicle occupant in the current image, it is unnecessary to calculate a new picture, since the differences from the current situation would not be visible within the framework of the given resolution. In this case, processing of the new request terminates.

If test 202 determines that the differences are not insignificant, the monitor unit computer 31 performs tests 204 to determine whether the information required to calculate the new picture information is present in the memory 32 (FIG. 1). This situation can occur for example, due to previous requests B, S. If this is the case, the new picture information can be calculated immediately by the monitor computing unit 31, stored in the memory 32, and displayed on the screen 36. However, if the test 204 determines that new map information must first be loaded from the navigation computer 1 over the data bus 3, the monitor unit 30 requests the necessary map information in step 206. In response to the request the navigation computer 1 sends the requested information over the data bus to the monitor unit 30, which is received and stored in steps 208, 210, respectively. The requested information includes formatted geographical coordinates, with additional parameters specifying these geographical coordinates (town, street, water bodies, etc.). In contrast, prior art navigation systems transmit the map information as whole pages (entire maps). Significantly, the present invention transmits only the geographical longitude and latitude together with additional parameters, thus reducing the bus load.

Following step 210, all the map information that is currently needed is now present in the monitor unit 30. Step 212 is then performed to generate new picture information in the monitor computing device 31, store the new picture information in the memory 32, and display the new picture information on the screen 36.

Although the present invention has been shown and described with respect to several preferred embodiments thereof, various changes, omissions and additions to the form and detail thereof, may be made therein, without departing from the spirit and scope of the invention.

What is claimed is:

1. A navigation system for use in a motor vehicle, comprising:
  a position sensor that senses the geographic position of the navigation system and provides a first navigation system position signal indicative thereof;
  a data bus;
  a navigation computing unit that receives the first navigation system position signal, and transmits onto the data bus (i) a first position signal indicative of the position of a trip starting location, (ii) a second position signal indicative of a trip destination location, and (iii) the first navigation system position signal;
  a monitor unit that includes
    a memory device that includes map data;
    a monitor computing unit that receives from the data bus (i) the first position signal, (ii) the second position signal and (iii) the first navigation system position signal, and accesses the memory device to generate initial image data including map data indicative of the trip starting location, the trip destination and the current position of the navigation system; and
    a display device responsive to the image data, to display an initial image indicative of the image data;
  where the navigation computing unit receives a second navigation position signal indicative of a new position of the navigation system and transmits the second navigation position signal over the data bus to the monitor computing unit, which generates revised image data including map data indicative of the trip destination and the updated position of the navigation system, which is provided for display on the display device.

2. The navigation system of claim 1, where the position sensor comprises a global position satellite (GPS) receiver.

3. The navigation system of claim 2, where the first position signal and the second position signal each include longitude and latitude position data.

4. The navigation system of claim 1, where the navigation computing unit also transmits to the monitor computing unit via the data bus (iv) an instruction that a place symbol belongs at the map location associated with the trip starting location, and (v) an instruction that a place symbol belongs at the map location associated with the trip destination location.

5. The navigation system of claim 4, where the navigation computing unit also transmits to the monitor computing unit via the data bus (vi) an instruction that a throughway runs between the trip starting location and the trip destination location.

6. The navigation system of claim 5, where the first and second position signals each include geographic data formatted in accordance with the WGS 84 Standard.

7. A motor vehicle navigation system, comprising:
  a position sensor that senses the geographical position of the navigation system and provides a first navigation system position signal indicative thereof;
  a data bus;

a navigation computing unit that receives the first navigation system position signal, and transmits onto the data bus (i) a first position signal indicative of the position of a trip starting location, (ii) a second position signal indicative of a trip destination location, and (iii) the first navigation system position signal;

a road map memory device that includes map data;

means responsive to (i) the first position signal, (ii) the second position signal and (iii) the first navigation system position signal and the map data, for generating initial image data including map data indicative of the trip starting location, the trip destination and the current position of the navigation system; and a display that displays an initial image indicative of the initial image data.

8. The motor vehicle navigation system of claim 7, where the navigation computing unit receives a second navigation position signal indicative of a new position of the navigation system and transmits the second navigation position signal over the data bus to the means for generating, which generates revised image data including map data indicative of the trip destination and the updated position of the navigation system, which is provided for display on the display.

9. The motor vehicle navigation system of claim 8, where the position sensor comprises a global position satellite (GPS) receiver.

10. The motor vehicle navigation system of claim 9, where the data bus comprises a Media Oriented Synchronous Transfer (MOST) bus.

11. The motor vehicle navigation system of claim 9, where the data bus comprises a Multi Media Link (MML) bus.

12. The motor vehicle navigation system of claim 7, where the navigation computing unit computes a travel route between the trip starting location and the trip destination, and transmits a signal indicative of the travel route to the means for generating over the data bus.

13. A method of generating an image for display by a motor vehicle navigation system that includes a navigation computing unit, a data bus and a monitor unit, comprising:

sensing the geographical position of the navigation system and providing a first navigation system position signal indicative thereof;

transmitting onto the data bus from the navigation computing unit (i) a first position signal indicative of the trip starting location, (ii) a second position signal indicative of a trip destination location, and (iii) the first navigation system position signal;

receiving at the monitor unit the first position signal, the second position signal, and the first navigation system position signal;

generating, at the monitor unit, initial image data including map data indicative of the trip starting location, the trip destination location and the current position of the navigation system; and displaying an initial image indicative of the initial image data.

* * * * *